(12) United States Patent
Kwon

(10) Patent No.: US 7,296,435 B2
(45) Date of Patent: Nov. 20, 2007

(54) REFRIGERATING SYSTEM HAVING RECIPROCATING COMPRESSOR

(75) Inventor: Gi-Bong Kwon, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 10/539,304

(22) PCT Filed: Jul. 10, 2003

(86) PCT No.: PCT/KR03/01372

§ 371 (c)(1),
(2), (4) Date: Jun. 16, 2005

(87) PCT Pub. No.: WO2004/057185

PCT Pub. Date: Jul. 8, 2004

(65) Prior Publication Data

US 2006/0064992 A1    Mar. 30, 2006

(30) Foreign Application Priority Data

Dec. 20, 2002 (KR) ............... 10-2002-0081899

(51) Int. Cl.
*F25B 43/02* (2006.01)
(52) U.S. Cl. .......................... 62/468; 62/469; 417/415; 417/417
(58) Field of Classification Search ............. 62/84, 62/114, 468, 469; 417/415, 417, 902; 184/32; 252/68
See application file for complete search history.

(56) References Cited

U.S. PATENT DOCUMENTS

| 5,517,824 | A | * | 5/1996 | Konishi et al. ............... 62/84 |
|---|---|---|---|---|
| 5,531,574 | A | | 7/1996 | Honma |
| 5,732,568 | A | * | 3/1998 | Konishi et al. ............... 62/471 |
| 5,956,959 | A | * | 9/1999 | Sunaga et al. ............... 62/114 |
| 5,966,949 | A | * | 10/1999 | Futagami et al. ............. 62/114 |
| 5,993,175 | A | * | 11/1999 | Kim et al. ................... 417/417 |
| 6,084,320 | A | * | 7/2000 | Morita et al. ................ 310/12 |
| 6,089,352 | A | * | 7/2000 | Kim et al. .................. 184/6.16 |
| 6,220,393 | B1 | * | 4/2001 | Oh et al. .................... 184/6.16 |
| 6,250,895 | B1 | * | 6/2001 | Kawahara et al. .......... 417/363 |
| 6,328,544 | B1 | * | 12/2001 | Kawahara et al. .......... 417/416 |
| 6,409,484 | B1 | | 6/2002 | Hyun |
| 6,413,057 | B1 | * | 7/2002 | Hong et al. ................. 417/416 |
| 6,688,431 | B2 | * | 2/2004 | Oh ............................. 184/6.16 |
| 6,875,000 | B2 | * | 4/2005 | Bae et al. ................... 417/417 |

FOREIGN PATENT DOCUMENTS

JP    10-197082 A  *  7/1998

* cited by examiner

*Primary Examiner*—Mohammad M. Ali
(74) *Attorney, Agent, or Firm*—Birch, Stewart, Kolasch & Birch, LLP

(57) ABSTRACT

A refrigerating system includes: an evaporator (2) for performing a cooling operation as a refrigerant is evaporated; a compressor (4) for compressing the refrigerant discharged from the evaporator as a mover is reciprocally moved; a condenser (6) for changing the refrigerant compressed in the reciprocating compressor to a liquid refrigerant; and a capillary tube (8) for decompressing the refrigerant discharged from the condenser and transferring it to the evaporator. The refrigerant is an HFC refrigerant, hydrogenated carbon fluoride comprising hydrogen, fluorine and carbon and the lubricant is an ester-based lubricant, a sort of synthetic fluid, so that a lubricating performance and a performance of the refrigerating system can be improved.

9 Claims, 2 Drawing Sheets

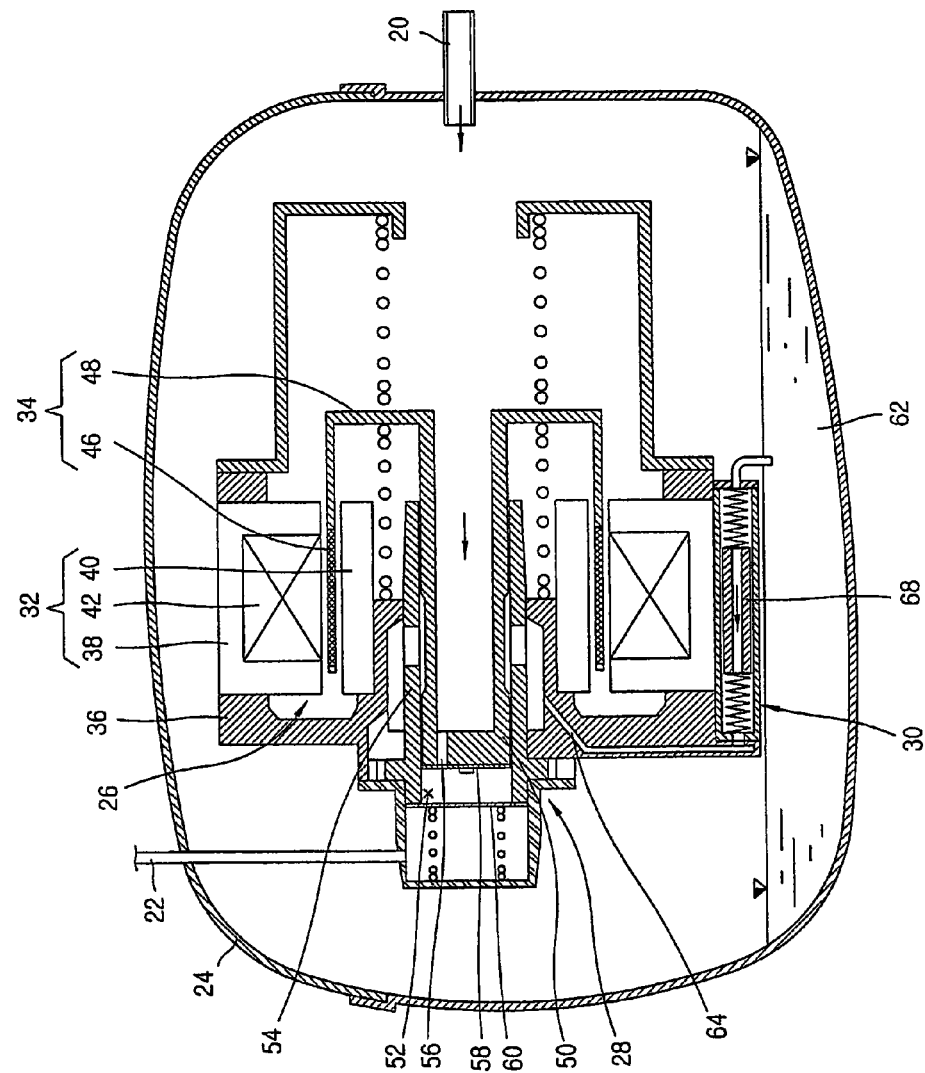

REFRIGERATING SYSTEM HAVING RECIPROCATING COMPRESSOR

TECHNICAL FIELD

The present invention relates to a refrigerating system for performing a compressing operation on a refrigerant by a reciprocating compressor and, more particularly, to a refrigerating system having a reciprocating compressor that is capable of improving a lubricating performance by enhancing a lubricant used for a reciprocating compressor and thus enhancing a performance of a refrigerating system.

BACKGROUND ART

As chlorofluorocarbon (CFC), a refrigerant used for a refrigerator, an air-conditioner or the like, has been known as a source material damaging an ozone layer of the stratosphere, researches on a substitute refrigerant are being actively conducted.

The substitute refrigerant for CFC/HCFC is desired to be environment-friendly as well as to have excellent thermodynamical and chemicophysical characteristics. That is, the substitute refrigerant should have a high energy efficiency, a zero ozone layer disintegration index, a low global warming index, no toxic character and incombustibility.

There are a few refrigerants which have no toxicity and no combustibility and are not CFC among methane-based and ethane-based halocarbon compounds: R22, R23, R134a, R123, R124 and R125. Of them, R22, R123 and R124, which are HCFC, are under regulation, and in case of R23, even though it is a kind of HFC, its thermodynamical property is not so good as to be utilized as a refrigerant.

HFC pure refrigerants usable as a substitute refrigerant among halocarbon are very limited. Thus, mixed refrigerants have been studied and developed as substitute refrigerants by mixing two or three pure materials at a suitable composition ratio to make up for shortcomings of the pure materials and thus obtain a good environment index.

R134a, R152a or cyclopropane (RC270) can substitute R12 which has been widely used for the home-use refrigerators and automobile air-conditioners. An HFC mixed refrigerant such as R404A and R507 is being taken into account as a substitute refrigerant of R502 mainly used as a low temperature refrigerant. Meanwhile, HFC mixed refrigerants including R32 are considered as substitute refrigerants of R22 used for a heat pump and various air-conditioning devices. Researches are under way for those substitute refrigerants.

The CFC includes R11 (trichloromonogluoromethane), R12 (dichlorodifluoromethane), R113 and the like, of which R12 largely used as a refrigerant for a refrigerator is one of regulation-subject materials as being a source material causing an ozone layer reduction and generating a global warming effect. Thus, currently, R134a is put to a practical use as a substitute refrigerant of R12.

As a representative example of HCF, R134a exhibits a zero ozone depletion potential, incombustibility and physical properties similar to R12, and is widely used as such.

However, with all those advantages, R134a is hardly combined with refrigerant oil currently used for a refrigerating system of R12 due to its peculiar chemical and electrical properties. Therefore, a refrigerant oil suitable for the refrigerant R134a is in need of development. Especially, necessity of a refrigerant oil usable for a reciprocating compressor for compressing the refrigerant R134a comes to the front.

FIG. 1 shows a construction of a general refrigerating cycle.

As shown in FIG. 1, a currently used refrigerating cycle includes: an evaporator 2 for performing a cooling operation as a low temperature and low pressure liquid refrigerant is evaporated; a compressor 4 for compressing the low temperature and low pressure gaseous refrigerant discharged from the evaporator 2 to a high temperature and high pressure gaseous refrigerant; a condenser 6 for changing the high temperature and high pressure gaseous refrigerant discharged from the compressor 4 to a high temperature and high pressure liquid refrigerant; and a capillary tube 8 for decompressing the refrigerant discharged from the condenser 6 so as to be easily evaporated and transferring it to the evaporator 2.

The refrigerant used for the refrigerating system is R134a, and a refrigerant oil used for the compressor 4 needs to have such physical and chemical characteristics that it is well harmonized with the refrigerant R134a.

That is, the refrigerant oil of the refrigerating system should have characteristics that it protects a oil film sufficiently even though the refrigerant is dissolved, it is sufficiently stable thermally and chemically so as not to react in spite of being in contact with a refrigerant or an organic material metal, etc. at a high temperature or at a low temperature, and it has a high level of thermal stability so as not to generate a carbon sludge or not to be oxidized at a high temperature part of the compressor.

In order to satisfy those characteristics, characters of the lubricant, such as a kinematic viscosity, a pour point, a density, a total acid number, a water content or the like, work as critical factors.

Therefore, if the refrigerant oil used for the refrigerating system is not harmonized with the refrigerant, oil circulation is deteriorated to degrade a heat transfer performance of the refrigerating system and a lubrication performance, resulting in that frictional portions of each motional part are abraded and thus each part is damaged. Then, the performance of the refrigerating system is deteriorated.

DISCLOSURE OF THE INVENTION

Therefore, it is an object of the present invention to provide a refrigerating system having a reciprocating compressor that is capable of improving a lubricating performance and a performance of a refrigerating system by using HFC, hydrogenated carbon fluoride, as a refrigerant for the refrigerating system and using a refrigerant oil well harmonized with the HFC refrigerant for the reciprocating compressor.

To achieve these objects, there is provided a refrigerating system of a reciprocating compressor including: an evaporator for performing a cooling operation as a refrigerant is evaporated; a reciprocating compressor which includes a driving unit having a stator consisting of an outer stator fixed inside a hermetic container, an inner stator disposed with a certain air gap with an inner circumferential surface of the outer stator, and a winding coil wound at one of the outer stator and the inner stator, to which power is applied from an external source, a mover consisting of magnets disposed at regular intervals between the outer stator and the inner stator and linearly and reciprocally moved when power is applied to the winding coil and a magnet frame, in which the magnets are mounted, for transmitting a linear reciprocal motional force to a compression unit, a compression unit for performing a compressing operation on a refrigerant upon receiving the linear reciprocal motional force of the driving unit, and a lubrication unit for supplying the lubricant, a sort of a mineral oil, to each motional portion of the driving unit and the compression unit and performing a lubricating operation; a condenser for changing the refrigerant compressed in the reciprocating compressor to a liquid refrigerant; and a capillary tube for decompressing the refrigerant discharged from the condenser and transmitting it to the evaporator, wherein the refrigerant is an HFC refrigerant, hydrogenated carbon fluoride comprising hydrogen, fluorine and carbon and not including chlorine, and the lubricant is an ester-based lubricant, a sort of synthetic fluid, with a high moisture absorption and a saturated water amount of 1500~2000 PPM.

In the refrigerating system having a reciprocating compressor of the present invention, an L-cord type heater is mounted at a lower portion of the evaporator, of which a heating wire is coated with a silicon material and a coating material made of an aluminum material is coated at an outer circumferential surface thereof.

In the refrigerating system having a reciprocating compressor of the present invention, a controller is additionally provided to vary a capacity of a compressor depending on an ambient temperature and environment.

In the refrigerating system having a reciprocating compressor of the present invention, the controller determines an output value according to a phase difference between a current and a voltage.

In the refrigerating system having a reciprocating compressor of the present invention, the magnet is an Nd (neodium) magnet.

In the refrigerating system having a reciprocating compressor of the present invention, the refrigerant has a zero ozone depletion potential (ODP) and is incombustible.

In the refrigerating system having a reciprocating compressor of the present invention, the refrigerant is HFC134a which has a purity of above 99.9%, a molecular formula of $CF_3CFH_2$, and a molecular weight of 102.

In the refrigerating system having a reciprocating compressor of the present invention, the lubricant has a density of 0.93~0.99 $g/cm^3$ at a temperature of 15° C. and a total acid number of below 0.01 mgKOH/g.

In the refrigerating system having a reciprocating compressor of the present invention, the lubricant has a flash point of below 240° C. and a kinematic viscosity (cSt) of 10.0~22.5 $mm^2/s$ at a temperature of 40° C.

In the refrigerating system having a reciprocating compressor of the present invention, the lubricant contains an additive such as a stabilizer or antioxidant, etc.

BRIEF DESCRIPTION OF THE DRAWINGS

FIG. 2 is a sectional view of the general reciprocating compressor.

MODES FOR CARRYING OUT THE PREFERRED EMBODIMENTS

Figure 1:
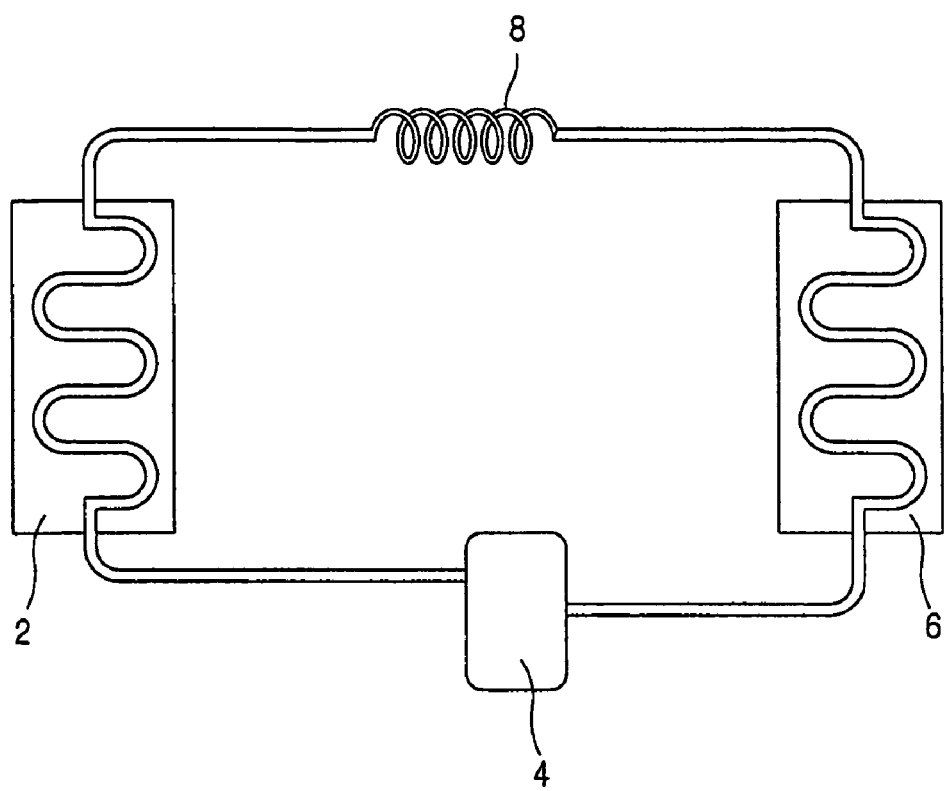
FIG. 1 illustrates the construction of a refrigerating cycle of a general refrigerating system.

FIG. 1 illustrates the construction of a refrigerating cycle of a general refrigerating system, and FIG. 2 is a sectional view of the general reciprocating compressor.

The refrigerating cycle of the refrigerating system includes: an evaporator 2 for performing a cooling operation as a low temperature and low pressure liquid refrigerant is evaporated; a compressor 4 for compressing the low temperature and low pressure gaseous refrigerant discharged from the evaporator 2 to a high temperature and high pressure gaseous refrigerant; a condenser 6 for changing the high temperature and high pressure gaseous refrigerant discharged from the compressor 4 to a high temperature and high pressure liquid refrigerant; and a capillary tube 8 for decompressing the refrigerant discharged from the condenser 6 so as to be easily evaporated and transferring it to the evaporator.

The refrigerating system includes a controller (not shown) which determines an output value according to a phase difference between a current and a voltage in order to vary a capacity of the compressor depending on an ambient temperature and environment.

The evaporator 2 is a fin-tube type evaporator with an L-cord type heater (not shown) mounted at its lower portion. The L-cord type heater has a structure that a heating wire is coated with a silicon material and a coating material made of aluminum is coated at its outer circumferential surface.

As shown in FIG. 2, the compressor 4 includes: a hermetic container 24 to which a suction pipe 20 for sucking a refrigerant and a discharge pipe 22 for discharging a compressed refrigerant; a driving unit 26 disposed inside the hermetic container 24 and generating a reciprocal motional force; a compression unit 28 for performing a compressing operation on the refrigerant upon receiving a reciprocal motional force generated from the driving unit 26; and a lubrication unit 30 for performing a lubrication operation on each motional portion of the driving unit 26 and the compression unit 28.

The driving unit 26 consists of a stator 32 fixed inside the hermetic container 24, and a mover 34 disposed spaced apart from the stator 32 and linearly and reciprocally moved by an interaction with the stator 32 when power is applied to the stator 32.

The stator 32 includes a cylindrical outer stator 38 fixed by a support frame 36 fixed inside the hermetic container 24, an inner stator 40 disposed with a certain air gap with an inner circumferential surface of the outer stator 38, and a winding coil 42 wound inside the outer stator 38 to which power is applied from an external source.

The mover 34 includes a magnet 46 disposed with a certain space between the outer stator 38 and the inner stator 40 and linearly and reciprocally moved when power is applied to the winding coil 42, and a magnet holder 48 having magnets 46 mounted at equal intervals at its an outer circumferential surface and being connected to a piston 50 of the compression unit 28.

The compression unit 28 includes a piston 50 connected to the magnet holder 48 and linearly and reciprocally moved; a cylinder 54 into which the piston 50 is slidably inserted to form a certain compression chamber 36; a suction valve 58 mounted at a refrigerant passage 56 formed at the piston 50 and preventing a backflow of the refrigerant after being introduced into the compression chamber 52; and a discharge valve 60 mounted at the front side of the cylinder 54 and performing an opening and closing operation on a compressed refrigerant.

The lubrication unit 30 includes a lubricant 62 filled with a certain amount at the lower portion of the hermetic container 24; a lubricant pumping unit 68 for pumping the lubricant 62; and a lubricant supply passage 64 for supplying the lubricant 62 pumped by the lubricant pumping unit 68 to a frictional portion between the piston 50 and the cylinder 54.

The operation of the refrigerating system constructed as described above will now be explained.

When the compressor 4 is driven, the low temperature and low pressure gaseous refrigerant is compressed to a high temperature and high pressure gaseous refrigerant, which is then introduced into the condenser 6 and changed to a liquid refrigerant The liquid refrigerant discharged from the condenser is decompressed while passing through the capillary tube 8 and then transferred to the evaporator 2. At this time, air is cooled while passing through the evaporator 2 and supplied into the refrigerating system, thereby performing a cooling operation therein.

The operation of the reciprocating compressor will now be described in detail.

When power is applied to the winding coil 42, a flux is formed around the winding coil 42, forming a closed loop along the outer stator 38 and the inner stator 40. By the interaction of the flux formed between the outer stator 38 and the inner stator 40 and the flux formed by the magnet 46, the magnet 46 is linearly moved in an axial direction. When the direction of a current applied to the winding coil 42 is changed in turn, the magnet 46 is linearly and reciprocally moved as the direction of the flux of the winding coil 42 is changed.

Then, the motion of the magnet 46 is transferred to the piston 50 by the magnet holder 48, and accordingly, the piston 50 is linearly and reciprocally moved inside the cylinder 54, thereby performing a compressing operation on the refrigerant.

That is, when the piston 50 is retreated, the refrigerant introduced into the suction pipe 20 is supplied to the compression chamber 52 through the suction passage 56 formed at the piston 50. Meanwhile, when the piston 50 advances, the suction passage 56 is closed by the suction valve 58, the refrigerant inside the compression chamber 52 is compressed, and the compressed refrigerant is externally discharged through the discharge pipe 22

During the compressing operation, the lubricant 62 filled in the hermetic container 24 is pumped according to operation of the lubricant pumping unit 68 and supplied to the frictional portion between the piston 50 and the cylinder 54 through the lubricant supply passage 64, for a lubricating operation.

As the refrigerant compressed by the reciprocating compressor constructed and operated as described above, the HFC refrigerant, hydrogenated carbon fluoride comprising hydrogen, fluorine and carbon without chlorine, is mainly used as having a high energy efficiency and a zero ODP (ozone depletion potential), is incombustible, and has a low global warming index, no toxicity and incombustibility.

Specifically, R32, R143a and R152a, etc. are used as the HFC refrigerant, of which HFC134a is preferably used for the current refrigerator as it has a purity of above 99.9%, a molecular formula $CF_3CFH_2$ and a molecular weight of 102.

As the lubricant of the reciprocating compressor for which the HFC34a refrigerant is used, an ester-based lubricant, a sort of synthetic fluid, is used as it has a good compatibility with the refrigerant and satisfies physical and chemical characteristics.

The density of the ester-based lubricant is preferably 0.93~0.99 g/cm$^3$ at a temperature of 15° C.

Preferably, a total acid number of the ester-based lubricant is adopted by below 0.01 mgKOH/g.

The total acid number of the lubricant, representing an amount of an acid component contained in an oil, indicates an amount of potassium hydroxide required for neutralizing an acid component contained in 1 g of sample oil by the number of mg. Since the lubricant used for the refrigerator should be absolutely neutral, the total acid number works as a basis for determining a deterioration level of the refrigerant oil.

A flash point of the ester-based lubricant varies depending on a size and a type of the reciprocating compressor. Preferably, it is below 240° C., and it can be below 165° C., below 175° C., below 185° C. and below 200° C. according to the type of an adopted compressor.

A kinematic viscosity (cSt) of the ester-based lubricant is preferably 10.0~22.5 mm$^2$/s at a temperature of 40° C.

A saturated water amount of the ester-based lubricant is preferably 1500~2000 PPM. The moisture contained in the lubricant should be maintained by below a suitable level because it causes freezing, sludge generation and corrosion.

A breakdown voltage of the ester-based lubricant is preferably above 30 KV.

As so far described, the refrigerating system having a reciprocating compressor of the present invention has such an advantage that since it uses the ester-based lubricant, a sort of a synthetic fluid, with an excellent compatibility with the HFC refrigerant, hydrogenated carbon fluoride comprising hydrogen, fluorine and carbon without chlorine, the lubricating performance is improved, a life span of the reciprocating compressor is lengthened and a performance of the refrigerating system can be enhanced.

It will be apparent to those skilled in the art that various modifications and variations can be made in the refrigerating system having a reciprocating compressor of the present invention without departing from the spirit or scope of the invention. Thus, it is intended that the present invention cover modifications and variations of this invention provided they come within the scope of the appended claims and their equivalents.

The invention claimed is:

1. A refrigerating system comprising:
an evaporator for performing a cooling operation as a refrigerant is evaporated;
a reciprocating compressor including:
   a driving unit for generating a linear reciprocal motional force,
   a compression unit for compressing the refrigerant upon receiving the linear reciprocal motional force of the driving unit, and
   a lubrication unit for supplying a lubricant to each motional portion of the driving unit and the compression unit and performing a lubricating operation;
a condenser for changing the refrigerant compressed in the reciprocating compressor to a liquid refrigerant; and
a capillary tube for decompressing the refrigerant discharged from the condenser and transmitting it to the evaporator,
wherein the refrigerant is a hydrofluorocarbon (HFC) refrigerant, and the lubricant is an ester-based lubricant with a high moisture absorption and a saturated water amount of 1500~2000 PPM, and
wherein the refrigerant is HFC134a which has a purity of above 99.9%, a molecular formula of $CF_3CFH_2$, and a molecular weight of 102.

2. The refrigerating system of claim 1, wherein the magnet is an Nd (neodium) magnet.

3. The refrigerating system of claim 1, wherein the refrigerant has a zero ozone depletion potential (ODP) and is incombustible.

4. The refrigerating system of claim 1, wherein the lubricant contains an additive including a stabilizer or antioxidant.

5. The refrigerating system of claim 1, wherein the driving unit includes a stator having an outer stator fixed inside a hermetic container, an inner stator disposed with a certain air gap with an inner circumferential surface of the outer stator, and a winding coil wound at one of the outer stator and the inner stator, to which power is applied from an external source, a mover having magnets disposed at regular intervals between the outer stator and the inner stator and linearly and reciprocally moved when power is applied to the winding coil and a magnet frame, in which the magnets are mounted.

6. A refrigerating system comprising:
an evaporator for performing a cooling operation as a refrigerant is evaporated;
a reciprocating compressor including:
　a driving unit for generating a linear reciprocal motional force,
　a compression unit for compressing the refrigerant upon receiving the linear reciprocal motional force of the driving unit, and
　a lubrication unit for supplying a lubricant to each motional portion of the driving unit and the compression unit and performing a lubricating operation;
a condenser for changing the refrigerant compressed in the reciprocating compressor to a liquid refrigerant; and
a capillary tube for decompressing the refrigerant discharged from the condenser and transmitting it to the evaporator,
wherein the refrigerant is a hydrofluorocarbon (HFC) refrigerant, and the lubricant is an ester-based lubricant with a high moisture absorption and a saturated water amount of 1500~2000 PPM, and
wherein the lubricant has a density of 0.93~0.99 g/cm$^3$ at a temperature of 15° C. and a total acid number of below 0.01 mgKOH/g.

7. The refrigerating system of claim 6, wherein the driving unit includes a stator having an outer stator fixed inside a hermetic container, an inner stator disposed with a certain air gap with an inner circumferential surface of the outer stator, and a winding coil wound at one of the outer stator and the inner stator, to which power is applied from an external source, a mover having magnets disposed at regular intervals between the outer stator and the inner stator and linearly and reciprocally moved when power is applied to the winding coil and a magnet frame, in which the magnets are mounted.

8. A refrigerating system comprising:
an evaporator for performing a cooling operation as a refrigerant is evaporated;
a reciprocating compressor including:
　a driving unit for generating a linear reciprocal motional force,
　a compression unit for compressing the refrigerant upon receiving the linear reciprocal motional force of the driving unit, and
　a lubrication unit for supplying a lubricant to each motional portion of the driving unit and the compression unit and performing a lubricating operation;
a condenser for changing the refrigerant compressed in the reciprocating compressor to a liquid refrigerant; and
a capillary tube for decompressing the refrigerant discharged from the condenser and transmitting it to the evaporator,
wherein the refrigerant is a hydrofluorocarbon (HFC) refrigerant, and the lubricant is an ester-based lubricant with a high moisture absorption and a saturated water amount of 1500~2000 PPM, and
wherein the lubricant has a flash point of below 240° C. and a kinematic viscosity (cSt) of 10.0~22.5 mm$^2$/s at a temperature of 40° C.

9. The refrigerating system of claim 8, wherein the driving unit includes a stator having an outer stator fixed inside a hermetic container, an inner stator disposed with a certain air gap with an inner circumferential surface of the outer stator, and a winding coil wound at one of the outer stator and the inner stator, to which power is applied from an external source, a mover having magnets disposed at regular intervals between the outer stator and the inner stator and linearly and reciprocally moved when power is applied to the winding coil and a magnet frame, in which the magnets are mounted.

* * * * *